US006613416B1

(12) United States Patent
Ashida et al.

(10) Patent No.: US 6,613,416 B1
(45) Date of Patent: Sep. 2, 2003

(54) INK-JET RECORDING MATERIAL

(75) Inventors: Tetsuya Ashida, Tokyo (JP); Yukio Tokunaga, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/645,492

(22) Filed: Aug. 25, 2000

(30) Foreign Application Priority Data

Aug. 31, 1999 (JP) .......................................... 11-244937
Sep. 28, 1999 (JP) .......................................... 11-273690

(51) Int. Cl.$^7$ .......................... C08K 3/36; B32B 27/08; B32B 27/10; B32B 27/20; B32B 27/32

(52) U.S. Cl. ....................... 428/195; 428/211; 428/516; 524/492

(58) Field of Search ................................ 523/160, 161; 524/492, 493, 557; 428/195, 211, 331, 516, 519, 521, 537.5

(56) References Cited

U.S. PATENT DOCUMENTS

| | | | | | |
|---|---|---|---|---|---|
| 5,262,290 | A | | 11/1993 | Nakatsugawa et al. | |
| 5,270,103 | A | * | 12/1993 | Oliver et al. | 428/219 |
| 5,620,793 | A | * | 4/1997 | Suzuki et al. | 428/342 |
| 5,958,168 | A | * | 9/1999 | Liu et al. | 156/230 |
| 5,985,424 | A | * | 11/1999 | DeMatte et al. | 428/212 |
| 6,132,878 | A | * | 10/2000 | Kojima et al. | 428/411.1 |
| 6,153,305 | A | * | 11/2000 | Uemura et al. | 428/478.2 |
| 6,165,606 | A | * | 12/2000 | Kasahara et al. | 428/323 |
| 6,190,781 | B1 | * | 2/2001 | Tsubkai et al. | 428/513 |
| 6,197,381 | B1 | * | 3/2001 | Saito et al. | 427/374.3 |

FOREIGN PATENT DOCUMENTS

| | | | |
|---|---|---|---|
| EP | 0 813 978 A1 | | 12/1997 |
| JP | 07189187 | * | 7/1995 |
| JP | 08-174992 | | 7/1996 |
| JP | 10-119423 | | 5/1998 |
| JP | 11-020300 | | 1/1999 |

OTHER PUBLICATIONS

English Translation of JP 07189187 (995).*

"*Testing Method for 75o Specular Gloss of Paper and Paperboard*", Japanese Industrial Standard, Edition 1, 1965, p. 8142.

"*Testing Method for 75o Specular Gloss of Paper and Paperboard*", Japanese Industrial Standard, Edtiion 1, 1993, p. 8142.

Japanese Industrial Standard—Surface roughness—Definitions and designation: JIS B 0601; 1994.

* cited by examiner

*Primary Examiner*—Callie Shosho
(74) *Attorney, Agent, or Firm*—Paul E. White, Jr.; Manelli Denison & Selter PLLC

(57) ABSTRACT

Disclosed is an ink-jet recording material comprising a polyolefin resin-coated paper support and at least one ink-receptive layer containing fumed silica provided on the support, wherein a surface of the support on which the ink-receptive layer is provided has been subjected to work into slightly rough surface so that 75 degrees specular glossiness according to JIS P 8142 is from 30% to less than 70%.

15 Claims, No Drawings

INK-JET RECORDING MATERIAL

BACKGROUND OF THE INVENTION

1. Field of the Invention

This invention relates to an ink-jet recording material, more specifically, to a photo-like ink-jet recording material using a polyolefin resin-coated paper which is a water-resistant paper support, particularly to an ink-jet recording material which has high glossiness and excellent ink absorption property, and causes no crazing at the surface of an ink-receptive layer.

2. Prior Art

As a recording material to be used for an ink-jet recording system, an ink-jet recording material which comprises, provided on a support such as a usual paper or the so-called ink-jet recording material, a porous ink absorption layer containing a pigment such as amorphous silica, etc., and a hydrophilic binder such as polyvinyl alcohol has been known.

There have been proposed ink-jet recording materials obtained by coating a silicon-containing pigment such as silica, etc., with a hydrophilic binder onto a paper support as disclosed in, for example, Japanese Provisional Patent Publications No. 51583/1980, No. 157/1981, No. 107879/1982, No. 107880/1982, No. 230787/1984, No. 160277/1987, No. 184879/1987, No. 183382/1987, No. 11877/1989, and the like.

Also, in Japanese Patent Publication No. 56552/1991, Japanese Provisional Patent Publications No. 113986/1990, No. 188287/1990, No. 269893/1996, No. 48602/1999, No. 48603/1999, No. 58938/1999 and No. 58939/1999, there have been disclosed to use synthetic silica fine particles prepared by a gas phase process (hereinafter referred to as "fumed silica") in an ink-receptive layer.

As a support for the above-mentioned ink-jet recording materials, paper has conventionally been used in general and the paper itself had a role as an ink absorption layer. In recent years, an ink-jet recording material having characteristics like photography has earnestly been desired. However, a recording sheet using paper as a support has problems of gloss, the feel of a material, water fastness, cockling (wrinkle or surface waviness) and the like. Thus, a water-resistant processed paper support such as a polyolefin resin-coated paper in which a polyolefin resin such as polyethylene is coated on the both surfaces of paper has now been used. A combination of a polyolefin resin-coated paper and fumed silica has been disclosed, for example, in EP0 813 978 A1, Japanese Provisional Patent Publications No. 174992/1996, No. 81064/1998, No. 119423/1998, No. 175365/1998, No. 203006/1998, No. 217601/1998, No. 20300/1999, No. 20306/1999 and No. 34481/1999.

However, these water-resistant supports such as a polyolefin resin-coated paper cannot absorb ink different from a paper support. Thus, in such a water-resistant support, it is important that an ink-receptive layer provided on the support has a high ink-absorption property. Accordingly, to prepare an ink-jet recording material using a polyolefin resin-coated paper support, a much amount of silica fine particles should be coated on the support as compared with that of an ink-jet recording material using a paper support. When the content of the silica fine particles is increased, surface crazing is likely caused on the surface of an ink-receptive layer at the time of drying whereby the quality of the material is markedly lowered.

The fumed silica is ultrafine particles and primary particles thereof have an average particle size of several nm to several tens lnm, so that high gloss can be easily obtained. Therefore, to utilize the characteristics (high gloss) of the fumed silica, a polyolefin resin-coated paper having a high specular gloss and surfaces with high glossiness has generally been used. However, when the fumed silica is coated on the polyolefin resin-coated paper having a high specular gloss and surfaces with high glossiness with a large amount, crazing as mentioned above easily occurs.

Also, in an ink-jet recording material using silica fine particles, there is a problem that the recording sheet is warped at the time of handling, crack is likely caused at the warped or folded portion.

Also, an ink-receptive layer mainly comprising the fumed silica can be produced by coating a coating solution containing a large amount of the fumed silica (e.g., about 5 to 10% by weight) on a support and drying. When the coating solution containing a large amount of inorganic fine particles is coated on a polyolefin resin-coated paper support, coating behavior is not good and coating failure such as coating streak, etc. is often generated.

SUMMARY OF THE INVENTION

An object of the present invention is to provide an ink-jet recording material which has high ink absorption property and gloss, and has no surface defect such as surface crazing, etc. Another object of the present invention is to provide an ink-jet recording material which causes no coating failure and has a uniform coating surface. Still another object of the present invention is to provide an ink-jet recording material which can prevent from generating crack at a warped or folded portion.

The above objects of the present invention have been achieved by an ink-jet recording material which comprises a polyolefin resin-coated paper support and at least one ink-receptive layer containing fumed silica provided on the support, wherein a surface of the support on which the ink-receptive layer is provided has been subjected to work into slightly rough surface so that 75 degrees specular glossiness according to JIS P 8142 is from 30% to less than 70%.

DESCRIPTION OF THE PREFERRED EMBODIMENTS

In the following, the embodiments of the present invention are explained in detail.

In the prior art, a support having high specular gloss and high glossiness has been used to obtain high gloss on the surface of an ink-receptive layer, but a problem of causing minute crazing (cracks) on the surface of the ink-receptive layer has newly been found out. Thus, the present inventors have studied to provide an ink-jet recording material which is capable of maintaining high gloss and causes no crazing and found that the problems can be solved by using a polyolefin resin-coated paper support the surface of which has subjected to work into slightly rough surface to have a specific surface gloss. Moreover, by using the above-mentioned support the surface of which has subjected to work into slightly rough surface, they have found that an ink-receptive layer coating solution containing the fumed silica can be uniformly coated.

The polyolefin resin-coated paper to be used as a support in the present invention is a material in which one or both surfaces of a base paper is/are coated and provided by a polyolefin resin layer. The polyolefin resin layer is provided at least a surface on which an ink-receptive layer is to be coated. In the present invention, it is preferred to have polyolefin resin layers on the both surfaces of the support.

The polyolefin resin-coated paper to be used in the present invention is a paper in which at least the surface on which an ink-receptive layer is to be coated is subjected to work into slightly rough surface so that 75 degrees specular glossiness according to JIS P 8142 is from 30% to less than 70%.

A base paper constituting the polyolefin resin-coated paper is not particularly limited, and any paper generally used may be employed. More preferably, a smooth base paper such as those used as paper for a photographic support may be used. As pulp constituting the base paper, natural pulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the base paper.

A thickness of the base paper is not particularly limited, and preferably that having a good surface smoothness prepared by compressing paper during paper-making or after paper-making by applying pressure using a calender, etc. Abasis weight thereof is preferably 30 to 250 g/$m^2$.

As a polyolefin resin to be used in the polyolefin resin layer, there may be mentioned, for example, a homopolymer of an olefin such as a low density polyethylene, a high density polyethylene, polypropylene, polybutene, polypentene, etc.; a copolymer comprising two or more olefins such as an ethylene-propylene copolymer, etc.; or a mixture thereof. These polymers having various densities and melt viscosity indexes (Melt Indexes) may be used singly or in combination of two or more.

Also, to the resin of the polyolefin resin layer, various kinds of additives including a white pigment such as titanium oxide, zinc oxide, talc, calcium carbonate, etc.; an aliphatic amide such as stearic amide, arachidamide, etc.; an aliphatic metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet, etc.; a fluorescent brightener, an UV absorber, etc. may be preferably added alone or optionally combining two or more.

The polyolefin resin-coated paper can be generally prepared by casting a melted polyolefin resin under heating between a base paper and a cooling roll by an extruder in a film state, and adhering it by pressure and cooling with the cooling roll. Before coating the polyolefin resin layer on the base paper, it is preferred to carry out an activation treatment such as a corona discharge treatment, a flame treatment, etc., of the base paper. It is not necessarily subjected to polyolefin resin coating at the back surface of the base paper (an opposite side to the surface on which the ink-receptive layer is coated), but in view of preventing curl, it is preferred to provide polyolefin resin layers on the both surfaces of the base paper. Also, a thickness of the polyolefin resin layer is not particularly limited, and is generally in the range of 5 to 50 $\mu$m.

The polyolefin resin-coated paper to be used in the present invention has been subjected to work into slightly rough surface so that the glossiness at the surface of the polyolefin resin layer becomes from 30% or more to less than 70%. The above-mentioned cooling roll is used to form a surface shape of the polyolefin resin layer. That is, the surface of the polyolefin resin layer can be formed to a high gloss (specular surface), non-gloss, or patterned surface such as a silky state or matte state, etc. depending on the surface state of the cooling roll surface. In the present invention, by using a cooling roll(s) the surface of which has been subjected to work into slightly rough surface, the work into slightly rough surface is applied to so as to become the glossiness at the surface of the polyolefin resin layer of 30% or more to less than 70%. The glossiness is preferably 35% to less than 70%, more preferably 40% or more to less than 68%. In the present invention, any means which can subject to work into slightly rough surface may be used so long as the means can make the glossiness of the surface 30% or more to less than 70%.

In the present invention, a slightly rough surface neither means a specular surface nor an embossing surface such as a silk surface or a matte surface, but means a surface having an extremely fine unevenness on the surface. The slightly rough surface referred to in the present invention can be mentioned, for example, a center surface average roughness (SRa). This SRa value is preferably in the range of 0.11 to 0.50, more preferably in the range of 0.11 to 0.35, most preferably in the range of 0.12 to 0.30.

The above-mentioned center surface average roughness (SRa) is an SRa value with a cut off value of 0.8 mm measured by using a feeler type three-dimensional surface roughness meter, and regulated by the following numerical formula:

$$SRa = \frac{1}{Sa}\int_0^{Wx}\int_0^{Wy} |f(X, Y)| dX, dY$$

wherein Wx represents a length of a sample surface area to an x-axis direction; Wy represents a length of the sample surface area to a y-axis direction; and Sa represents an area of the sample surface area.

More specifically, by using Type SE-3AK and Type SPA-11 (both manufactured by Kosaka Kenkyusho, Japan) as the feeler type three-dimensional surface roughness meter and a three-dimensional roughness analyzing machine, respectively, it can be obtained under the conditions of the cut off value=0.8 mm, Wx=20 mm and Wy=8 mm, i.e., Sa=160 $mm^2$.

The surface shape of the cooling roll to be used in the present invention is not specifically limited so long as it is processed to a slightly rough surface. There may be used a cooling roll as disclosed in, for example, Japanese Provisional Patent Publications No. 118557/193, No. 261325/1995, No. 254789/1996 and No. 293379/1998, and Japanese Patent Publication No. 19732/1988. For example, a cooling roll with a surface having fine unevenness with an average depth at the surface of 0.05 to 0.7 $\mu$m, and an average pitch of 0.1 to 100 $\mu$m.

A water content of the polyethylene resin-coated paper to be used in the present invention is preferably 6% by weight or more and an upper limit thereof is about 9%, more preferably in the range of 6.5% to 9.0% based on the total weight of the polyethylene resin-coated paper. A general method for adjusting the water content of the polyolefin resin-coated paper may include, for example, a method of controlling drying procedure using a dryer when a base paper is to be prepared or a method of controlling the content by providing a moisture conditioning zone after completion of drying. The water content of the polyolefin resin-coated paper can be measured by the absolute dry weight (or oven-dry weight) method.

By making the water content of the polyethylene resin-coated paper 6% by weight or more, ink-absorption property and glossiness are more improved.

To the polyethylene resin-coated paper to be used in the present invention is preferably provided a subbing layer on the surface to which an ink-receptive layer is provided. This subbing layer is previously coated and dried on the surface of the polyolefin resin layer before coating an ink-receptive layer. This subbing layer mainly comprises a film-formable water-soluble polymer or polymer latex, etc., more preferably, a water-soluble polymer such as gelatin, polyvinyl alcohol, polyvinyl pyrrolidone, water-soluble cellulose, etc., particularly preferably gelatin. Moreover, the subbing layer preferably contains a surfactant or a film-hardening agent. An amount of the subbing layer to be coated on the polyolefin resin-coated paper is preferably 500 $mg/m^2$or less and a lower limit of about 10 $mg/m^2$, more preferably in the range of 20 to 300 $mg/m^2$ with a solid content. Before coating the subbing layer on the surface of the polyolefin resin layer, corona discharge treatment is preferably carried out on the surface thereof. By providing the subbing layer, crazing at the time of drying of the ink-receptive layer can be further prevented. Also, when fumed silica is used, crack is likely caused on the surface of the ink-receptive layer when the ink-jet recording material is folded, but it can be prevented by providing the subbing layer.

In the present invention, various kinds of back coating layer(s) may be provided by coating on the above-mentioned support to provide an antistatic property, conveying property, anticurl property, etc. In the back coating layer, an inorganic antistatic agent, an organic antistatic agent, a hydrophilic binder, a latex, a hardening agent, a pigment, a surfactant, etc., may be optionally contained in combination.

The ink-jet recording material of the present invention comprises an ink-receptive layer mainly containing fumed silica provided on the above-mentioned polyolefin resin-coated paper support. The term “mainly containing fumed silica” referred to means that the fumed silica is contained in an amount of 50% by weight or more, preferably 60% by weight or more, more preferably 65% by weight or more based on the total solid component of the ink-receptive layer.

In synthesized silica, there are two types of materials, one (precipitated silica) of which is prepared by the wet process and the other (fumed silica) is prepared by the gas phase process. Usual silica fine particles mean those prepared by the wet process in many cases. As the silica prepared by the wet process, there are (1) a silica sol obtained by metathesis of sodium silicate by an acid or passing through an ion exchange resin layer; (2) a colloidal silica obtained by heating and maturing the silica sol of (1); (3) a silica gel obtained by gelling silica sol in which formation conditions thereof are changed whereby primary particles of a silica gel having a diameter of several microns to 10 microns are agglomerated to form three-dimensional secondary particles; and (4) a synthetic silicic acid compound mainly comprising silicic acid obtained by heating silica sol, sodium silicate, sodium aluminate, etc.

Fumed silica to be used in the present invention is also called to as the drying method contrary to the wet method, and the fumed silica can be generally prepared by a flame hydrolysis method. More specifically, it has been known a method in which silicon tetrachloride is burned with hydrogen and oxygen. In this method, silanes such as methyl trichlorosilane, trichlorosilane, etc., may be used alone in place of silicon tetrachloride or in combination of silicone tetrachloride. The fumed silica is commercially available from Nippon Aerosil K.K. (Japan) under the trade name of Aerosil, and K.K. Tokuyama (Japan) under the trade name of QS type, etc.

In the present invention, it is preferred to use fumed silica having an average primary particle size of 30 nm or less. To obtain a higher gloss, it is more preferred to use fumed silica having an average primary particle size of 3 to 20 nm and having a specific surface area measured by the BET (Brunauer-Emmett-Teller) method of 90 $m^2/g$ or more, particularly preferably having an average primary particle size of 3 to 10 nm and a specific surface area measured by the BET method of 250 $m^2/g$ or more (an upper limit of the specific surface area is 500 $m^2/g$ or so). The BET method herein mentioned means one of a method for measuring surface area of powder material by a gas phase adsorption method and is a method of obtaining a total surface area possessed by 1 g of a sample, i.e., a specific surface area, from an adsorption isotherm. As an adsorption gas, a nitrogen gas has frequently been used, and a method of measuring an adsorption amount obtained by the change in pressure or a volume of a gas to be adsorbed has most frequently been used. Most frequently used equation for representing isotherm of poly molecular adsorption is a Brunauer-Emmett-Teller equation which is also called to as a BET equation and has widely been used for determining a surface area of a substance to be examined. A specific surface area can be obtained by measuring an adsorption amount based on the BET equation and multiplying the amount with a surface area occupied by the surface of one adsorbed molecule.

An amount of the fumed silica to be contained in the ink-receptive layer in the present invention is preferably in the range of 10 to 25 $g/m^2$, more preferably in the range of 12 to 25 $g/m^2$. The ink-receptive layer containing fumed silica preferably contains a hydrophilic binder to maintain the characteristic as a film. As the hydrophilic binder, there may be used various kinds of known hydrophilic binders, and preferably used is a hydrophilic binder having high transparency and is capable of obtaining high permeability of ink. For the use of the hydrophilic binder, it is important that the hydrophilic binder does not clog voids of the layer by swelling at the initial stage of impregnating ink. In this point of view, a hydrophilic binder having a relatively low swellability at around the room temperature is preferably used.

Particularly preferred hydrophilic binders may include, for example, a completely or partially saponified polyvinyl alcohol or a cation-modified polyvinyl alcohol. For dispersing the fumed silica, conventionally known dispersing machines such as a high-pressure homogenizer, ball mill, etc., may be used.

Among the polyvinyl alcohols as mentioned above, particularly preferred is a partially saponified polyvinyl alcohol having a saponification degree of 80% or more or a completely saponified polyvinyl alcohol. It is also preferred that the polyvinyl alcohol has an average polymerization degree of 500 to 5000.

As the cation-modified polyvinyl alcohol, preferred is a polyvinyl alcohol having a primary to tertiary amino group or a quaternary ammonium group at the main chain or the side chain of the polyvinyl alcohol as disclosed in, for example, Japanese Provisional Patent Publication No. 10483/1986.

Also, other hydrophilic binder may be used in combination, but an amount thereof is preferably 20% by weight or less based on the amount of the polyvinyl alcohol. An amount of the hydrophilic binder to be used in combination with the fumed silica is preferably 30% by weight or less based on the amount of the fumed silica. For obtaining a high ink absorption property, it is preferred to lower the content of the binder based on the fumed silica, but crazing is more likely caused. Accordingly, by using a polyolefin resin-coated paper support subjected to work into slightly rough surface of the present invention, it is one of the characteristic features of the present invention to prevent from causing crazing without lowering an ink absorption property.

In the present invention, by using a water-soluble metallic compound in the ink-receptive layer in combination with the polyolefin resin-coated paper support subjected to work into slightly rough surface, crazing can be further prevented.

Accordingly, it is also possible to further lower an amount of the hydrophilic binder and increase an amount of the fumed silica to improve an ink absorption property.

The water-soluble metallic compound to be used in the present invention may include, for example, as a water-soluble polyvalent metallic salt, a water-soluble salt of a metal selected from the group consisting of calcium, barium, manganese, copper, cobalt, nickel, aluminum, iron, zinc, zirconium, titanium, chromium, magnesium, tungsten, and molybdenum. In the present invention, the term "water-soluble" means the compound dissolves in water in an amount of 1% by weight or more under normal temperature and normal pressure. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, titanium chloride, titanium sulfate, zirconium acetate, zirconium chloride, zirconium oxychloride, zirconium hydroxychloride, zirconiumnitrate, basic zirconiumcarbonate, zirconium hydroxide, ammonium zirconium carbonate, potassium zirconium carbonate, zirconium sulfate, zirconium fluoride, chromium acetate, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc.

Also, as the water-soluble aluminum compound, there is a polyaluminum hydroxychloride compound which is an inorganic aluminum-containing cationic polymers.

The above-mentioned polyaluminum hydroxychloride compound is a water-soluble poly(aluminum hydroxide) which comprises, as its main component, at least one of those represented by the following formulae (1) to (3) and containing a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

| | | |
|---|---|---|
| $[Al_2(OH)_nCl_{6-n}]_m$ | | (1) |
| $[Al(OH)_3]_nAlCl_3$ | | (2) |
| $Al_n(OH)_mCl_{(3n-m)}$ | $0 < m < 3n$ | (3) |

These water-soluble aluminum compounds are commercially available from Taki Chemical, K.K., Japan under the name of poly(aluminum chloride) (PAC, trade name) as a water treatment agent, from Asada Chemical K.K., Japan under the name of poly(aluminum hydroxide) (Paho, trade name), from K.K. Riken Green, Japan under the name of Pyurakemu WT (trade name) and other manufacturers with the same objects whereby various kinds of different grade can be easily obtained.

In the present invention, the content of the above-mentioned water-soluble metallic compound in the ink-receptive layer is preferably 0.1 g/m$^2$ to 10 g/m$^2$, more preferably 0.2 g/m$^2$ to 5 g/M$^2$.

In the present invention, a cationic polymer maybe further added to the ink-receptive layer to improve water fastness. As the cationic polymers which can be preferably used in the present invention, there may be mentioned cationic polymers such as a polyethyleneimine, a polydiallylamine, a polyallylamine, a polymer having a primary to tertiary amino group or a quaternary ammonium group as disclosed in Japanese Provisional Patent Publications No. 20696/1984, No. 33176/1984, No. 33177/1984, No. 155088/1984, No. 11389/1985, No. 49990/ 1985, No. 83882/1985, No. 109894/1985, No. 198493/1987, No. 49478/1998, No. 115780/1988, No. 280681/1988, No. 40371/1989, No. 234268/1994, No. 125411/1995, and No. 193776/1998, etc. A weight average molecular weight (Mw) of these cationic polymers is preferably 5,000 or more, more preferably 5,000 to 100,000 or so.

An amount of these cationic polymer to be used is preferably 1 to 10% by weight, more preferably 2 to 7% by weight based on the amount of the fumed silica.

The ink-receptive layer of the present invention may further contain various kinds of oil drops to improve brittleness of the film. As such oil drops, a hydrophobic organic solvent having a high boiling point and a solubility in water at room temperature of 0.01% by weight or less (e.g., liquid paraffin, dioctyl phthalate, tricresyl phosphate, silicone oil, etc.), polymer particles (e.g., particles obtained by polymerizing at least one of polymerizable monomers such as styrene, butyl acrylate, divinylbenzene, butyl methacrylate, hydroxyethyl methacrylate, etc.) or the like may be used. The above-mentioned oil drops can be preferably used in an amount in the range of 10 to 50% by weight based on the amount of the hydrophilic binder.

In the present invention, it is preferred to use a suitable cross-linking agent (or a hardening agent) in the ink-receptive layer in combination with the hydrophilic binder. Specific examples of the cross-linking agent may include an aldehyde series compound such as formaldehyde, glutaraldehyde, etc.; a ketone compound such as diacetyl, chloropentadione, etc.; bis.(2-chloroethylurea)-2-hydroxy-4,6-dichloro-1,3,5-triazine, a compound having areactive halogen as disclosed in U.S. Pat. No. 3,288,775, divinylsulfone, a compound having a reactive olefin as disclosed in U.S. Pat. No. 3,635,718, a N-methylol compound as disclosed in U.S. Pat. No. 2,732,316, an isocyanate compound as disclosed in U.S. Pat. No. 3,103,437, an aziridine compound as disclosed in U.S. Pat. Nos. 3,017, 280, 2,983,611, etc., a carbodiimide series compound as disclosed in U.S. Pat. No. 3,100,704, an epoxy compound as disclosed in U.S. Pat. No. 3,091,537, a halogen carboxyaldehyde compound such as mucochloric acid, a dioxane derivative such as dihydroxydioxane, an inorganic cross-linking agent such as chromium alum, zirconium sulfate, boric acid and a borate, and they may be used singly or in combination of two or more. Of these cross-linking agents, boric acid or a borate is particularly preferred. The above-mentioned cross-linking agent may be preferably used in an amount of 0.01 to 40% by weight based on the amount of the hydrophilic binder constituting the ink-receptive layer.

In the present invention, to the ink-receptive layer may be added, in addition to the surfactant and cross-linking agent, various kinds of conventionally known additives such as a coloring dye, a coloring pigment, a fixing agent of the ink dye, an UV absorber, an antioxidant, a dispersant of the pigment, a defoaming agent, a leveling agent, an antiseptic agent, a fluorescent brightener, a viscosity stabilizer, a pH controller, etc.

In the present invention, a coating method of the ink-receptive layer is not particularly limited, and any coating method conventionally known in the art may be used. For example, there may be mentioned a slide bead system, a curtain system, an extrusion system, an air knife system, a roll coating system, a rod bar coating system, etc.

In the present invention, preferred conditions for drying the ink-receptive layer after coating it on the support are to cool the coated layer with air of 15° C. or lower (more preferably air of 10° C. or lower) for 10 seconds or longer, and then, to blow air having a temperature of 60° C. or lower. By using these drying conditions, crazing can be further prevented.

In the present invention, it is preferred to subject an ink-jet recording material prepared by coating and drying an ink-receptive layer on a polyolefin resin-coated paper support to heat treatment at a temperature of 30° C. or higher for 10 hours or longer. More preferably it is subjected to heat treatment at a temperature of 33 to 50° C. for one to 12 days. By effecting the heat treatment, an ink absorption property and glossiness can be further improved.

EXAMPLES

In the following, the present invention is described in detail by referring to Examples, but the scope of the present invention is not limited by these.

Example 1

(Preparation of Support)

A mixture of a bleached craft pulp of hardwood (LBKP) and a bleached sulfite pulp of softwood (NBSP) in amounts of 1:1 was subjected to beating until it becomes 300 ml with a Canadian Standard Freeness to prepare a pulp slurry. To the slurry were added 0.5% by weight of an alkylketene dimer based on the pulp as a sizing agent, 1.0% by weight of a polyacrylamide based on the pulp as a strengthening additive of paper, 2.0% by weight of a cationic starch based on the pulp, and 0.5% by weight of a polyamide epichlorohydrin resin based on the pulp, and the resulting slurry was diluted by water to make a 1% by weight of a slurry. Paper was prepared from the slurry by using a wire paper machine with a basis weight of 170 g/m$^2$ whereby it was made a base paper for a polyolefin resin-coated paper. The base paper thus prepared was subjected to extrusion coating by a polyethylene resin composition in which 10% by weight of an anatase type titanium oxide had been uniformly dispersed in 100% by weight of a low density polyethylene with a density of 0.918 g/cm$^3$ and melted at 320° C., with the conditions of 200 m/min so as to have a thickness of 30 $\mu$m, and then subjected to extrusion coating by using various kinds of cooling rolls so as to have a glossiness shown in Table 1. On the other surface of the base paper, a blend resin composition comprising 70 parts by weight of a high-density polyethylene resin with a density of 0.962 g/cm$^2$ and 30 parts by weight of a low-density polyethylene resin with a density of 0.918 g/cm$^2$ melted at 320° C. was subjected to extrusion coating with a thickness of 30 $\mu$m. A water content of the thus prepared support was each 7.5% (by weight).

The SRa value of the support described in Table 1 was 0.09 to 0.10 in the specular surface support, 0.12 to 0.30 in the support having a slightly rough surface according to the present invention, 2.0 in the support of a matte surface, and 3.5 in the support of having a silk surface.

On the above-mentioned support was coated a coating solution for preparing an ink-receptive layer having the following composition by a slide bead coating device. The ink-receptive layer coating solution shown below was so prepared that the amount (solid content) of the fumed silica became 8% by weight based on the coating solution. This coating solution was coated on the support so that a coated amount of the fumed silica being 16 g/m$^2$. The drying conditions after coating are that the coated layer was cooled to 5° C. immediately after coating for 20 seconds, and then, blew air at 30 to 50° C. Incidentally, all the term "part(s)" means "part(s) by weight".

(Coating Solution A for Preparing an Ink-receptive Layer)

| | |
|---|---|
| Fumed silica<br>(Average primary particle size: 7 nm, Specific surface area by BET method: 300 m$^2$/g) | 100 parts |
| Dimethyldially ammonium chloride homopolymer | 4 parts |
| Boric acid | 3 parts |
| Polyvinyl alcohol<br>(Saponification degree: 88%, Average polymerization degree: 3500) | 23 parts |
| Surfactant | 0.3 part |

(Coating Solution B for Preparing an Ink-receptive Layer)

The solution was prepared in the same manner as in Coating solution A except for changing an amount of the polyvinyl alcohol of the above Coating solution A to 33 parts.

(Coating Solution C for Preparing an Ink-receptive Layer)

The solution was prepared in the same manner as in Coating solution A except for changing the fumed silica to a precipitated silica (an average particle size: 5.5 to 6.5 $\mu$m, Fineseal X-60, trade name, available from K.K. Tokuyama).

With regard to the thus prepared ink-jet recording materials, the following evaluations were carried out. The results are shown in Table 1.

(Glossiness)

Glossiness was measured according to the method described in JIS P-8142 (Testing method for 75° specular glossiness of paper and board).

(Ink Absorption Property)

By using a plotter (Novajet-PRO42e, trade name, manufactured by ENCAD Co.) and GS ink (trade name), C (cyan), M (magenta) andY (yellow) were each printed with 100%, and immediately after the printing, a PPC paper was overlapped on the printed portion with slightly pressurizing, and the degree of an amount of the ink transferred to the PPC paper was observed with naked eyes and evaluated by the following standards.

○: No transfer was observed.

Δ: Transfer was slightly admitted.

(Surface Crazing)

Presence or absence of crazing at the coated surface was judged with naked eyes and evaluated by the following standards.

○: No crazing was observed.

Δ: Crazing was slightly admitted.

X: Crazing was clearly admitted.

TABLE 1

| Support glossiness (%) | Coating solution | Ink-receptive layer glossiness (%) | Ink-absorption property | Crazing | Remarks |
|---|---|---|---|---|---|
| 89 (Specular surface) | A | 45 | ○ | X | Comparative 1 |
| 77 (Specular surface) | A | 45 | ○ | X | Comparative 2 |
| 89 (Specular surface) | B | 52 | Δ | Δ | Comparative 3 |
| 63 (Slightly rough surface) | A | 64 | ○ | ○ | This invention 1 |
| 63 (Slightly rough surface) | B | 64 | Δ | ○ | This invention 2 |
| 63 (Slightly rough surface) | C | 13 | ○ | ○ | Comparative 4 |
| 50 (Slightly rough surface) | A | 62 | ○ | ○ | This invention 3 |
| 50 (Slightly rough surface) | B | 62 | Δ | ○ | This invention 4 |
| 35 (Slightly rough surface) | A | 56 | ○ | ○ | This invention 5 |
| 35 (Slightly rough surface) | B | 56 | Δ | ○ | This invention 6 |
| 23 (Matte surface) | A | 32 | ○ | ○ | Comparative 5 |
| 16 (Silk surface) | A | 17 | ○ | ○ | Comparative 6 |
| 16 (Silk surface) | B | 17 | Δ | ○ | Comparative 7 |

From the above results, the ink-jet recording materials of the present invention which use a polyolefin resin-coated paper subjected to work into slightly rough surface with a surface glossiness of 30% or more to less than 70% and use fumed silica in the ink-receptive layer show high glossiness and can prevent from causing crazing.

Example 2

The following coating solutions for preparing an ink-receptive layer were prepared.

(Coating Solution D for Preparing an Ink-receptive Layer)

The solution was prepared in the same manner as in Coating solution A in Example 1 except for changing an amount of the polyvinyl alcohol of the Coating solution A to 20 parts.

(Coating Solution E for Preparing an Ink-receptive Layer)

The solution was prepared by adding 4 parts of polyaluminum hydroxychloride (trade name: Pyurakemu WT, available from K.K. Riken Green, Japan) to Coating solution D as mentioned above.

(Coating Solution F for Preparing an Ink-receptive Layer)

The solution was prepared by adding 4 parts of zirconium nitrate (available from Nippon Keikinzoku K.K., Japan) to Coating solution D as mentioned above.

The above-mentioned respective coating solutions for preparing an ink-receptive layer were coated on the support subjected to work into slightly rough surface used in Example 1 and dried in the same manner as in Example 1 to prepare ink-jet recording materials. However, coating was carried out so that a coated amount of the fumed silica was made, in a solid content, 18 $gm^2$.

The resulting ink-jet recording materials were evaluated in the same manner as in Example 1. As a result, in Coating solution D for preparing an ink-receptive layer, occurrence of crazing was extremely slightly observed, but no occurrence of crazing was observed in Coating solutions E and F. In either of the ink-jet recording materials, each ink-absorption property was further improved by lowering the amount of the polyvinyl alcohol and increasing the coated amount of the fumed silica. Also, glossiness was also high as in Example 1.

From the above results, it can be understood that occurrence of crazing can be prevented by using a water-soluble metallic compound even under the severer conditions to crazing (less amount of the polyvinyl alcohol and increased amount of fumed silica).

Example 3

Coating solution A prepared in Example 1 was coated on a specular surface and a slightly rough surface of the support used in Example 1 by using a curtain coating device with a rate of 100 m/min. Coated surfaces of the ink-receptive layers at that time were evaluated with naked eyes. As a result, when the support having a slightly rough surface of the present invention was used, the coated surface was uniform, but the support having a specular surface for comparative purpose occurred a coating streak.

Example 4

The polyolefin resin-coated paper subjected to work into slightly rough surface prepared in Example 1 was subjected to high-frequency corona discharge treatment, and then, a subbing layer with the following composition was so coated on the surface of the paper support that an amount of gelatin becomes 50 $mg/m^2$ and dried to prepare a support.

(Subbing Layer)

| | |
|---|---|
| Gelatin | 100 parts |
| 2-Ethylhexyl sulfosuccinate | 2 parts |
| Chromium alum | 10 parts |

On the subbing layer of the above-mentioned support was coated Coating solution D for preparing an ink-receptive layer used in Example 2 so that the coated amount of the fumed silica becomes 19 $g/m^2$ with a solid content and dried in the same manner as in Example 1 to prepare an ink-jet recording material. Coating solution D is a prescription easily causing crazing on the surface of the ink-receptive layer at the time of drying, and crazing is more likely caused by increasing the amount of fumed silica to be coated. Irrespective of this prescription, occurrence of crazing was not observed in this example by providing a subbing layer. Also, by increasing the amount of the fumed silica to be coated, an ink-absorption property was further improved and glossiness is also high as in Example 1.

Moreover, by warping the recording material, whether the surface of the ink-receptive layer generates crack or not was tested. As a result, even when the recording material was warped until a radius of curvature became 5 mm, no crack was observed.

Example 5

An ink-jet recording material was prepared in the same manner as in Example 4, and the material was subjected to heat treatment at 40° C. for 3 days. Then, an ink absorption property and glossiness were evaluated in the same manner as in Example 1. Provided that evaluation of the ink absorption property was carried out with four colors by further adding black ink. As a result, good ink absorption property can be obtained irrespective of increasing an amount of the ink. The glossiness was more improved with a degree of about 2% being heightened.

What is claimed is:

1. An ink-jet recording material comprising a polyolefin resin-coated paper support and at least one ink-receptive layer containing fumed silica and a water-soluble polyvalent metallic compound provided on the support, wherein a surface of the support on which the ink-receptive layer is provided has been subjected to work, by using a cooling roll with a surface having fine unevenness with an average depth at the surface of 0.05 to 0.7 μm and an average pitch of 0.1 to 100 μm, into slightly rough surface with a center surface average roughness SRa represented by the following formula of the support being 0.11 to 0.50 and 75 degrees specular glossiness according to JIS P 8142 is from 30% to less than 70%, $$SRa = \frac{1}{Sa}\int_{o}^{Wx}\int_{o}^{Wy}|f(X, Y)|\,dX, dY$$

wherein Wx represents a length of a sample surface area to an x-axis direction; Wy represents a length of the sample surface area to a y-axis direction; and Sa represents an area of the sample surface area.

2. The ink-jet recording material according to claim 1, wherein a water content of the support is 6% by weight or more.

3. The ink-jet recording material according to claim 1, wherein a subbing layer is provided on the surface of the support on which an ink-receptive layer is to be provided.

4. The ink-jet recording material according to claim 3, wherein a solid component of the subbing layer coated on to the support is 500 $mg/m^2$ or less.

5. The ink-jet recording material according to claim 4, wherein the subbing layer mainly contains a water-soluble polymer or a polymer latex.

6. The ink-jet recording material according to claim 4, wherein the subbing layer mainly contains gelatin.

7. The ink-jet recording material according to claim 1, wherein the fumed silica has an average primary particle size of 30 nm or less.

8. The ink-jet recording material according to claim 1, wherein the fumed silica has an average primary particle size of 3 to 20 nm and a specific surface area measured by a BET method of 90 $m^2/g$ or more.

9. The ink-jet recording material according to claim 1, wherein the fumed silica has an average primary particle size of 3 to 10 nm and a specific surface area measured by a BET method of 250 $m^2/g$ or more.

10. The ink-jet recording material according to claim 1, wherein the ink-receptive layer contains the fumed silica in an amount of 10 to 25 $g/m^2$ and a hydrophilic binder in an amount of 30% by weight or less based on the amount of the fumed silica.

11. The ink-jet recording material according to claim 10, wherein the hydrophilic binder is a polyvinyl alcohol.

12. The ink-jet recording material according to claim 1, wherein a metal of the water-soluble polyvalent metallic compound is zirconium or aluminum.

13. The ink-jet recording material according to claim 1, wherein the support has a center surface average roughness SRa of 0.12 to 0.30.

14. The ink-jet recording material according to claim 1, wherein the surface of the support on which the ink-receptive layer is provided has 75 degrees specular glossiness according to JIS P 8142 of from 35% to less than 70%.

15. The ink-jet recording material according to claim 1, wherein the surface of the support on which the ink-receptive layer is provided has 75 degrees specular glossiness according to JIS P 8142 of from 40% or more to less than 68%.

* * * * *